United States Patent [19]
Makarenko et al.

[11] Patent Number: 5,468,331
[45] Date of Patent: Nov. 21, 1995

[54] APPARATUS FOR MAKING A BONDED LAMINATED ARTICLE BEND PORTION

[75] Inventors: Peter Makarenko; Stacy E. Harris, both of Albuquerque; Robert R. Martin, Tijeras, all of N.M.

[73] Assignee: General Electric Company, Cincinnati, Ohio

[21] Appl. No.: 236,818

[22] Filed: May 2, 1994

Related U.S. Application Data

[62] Division of Ser. No. 73,395, Jun. 8, 1993, Pat. No. 5,348,602.

[51] Int. Cl.$^6$ ..................................................... B32B 31/00
[52] U.S. Cl. ........................... 156/494; 156/382; 156/500; 425/503; 425/504
[58] Field of Search ................................. 264/102, 258, 264/511, 571; 156/500, 242, 245, 382, 161, 494; 425/500, 503, 504, 518

[56] References Cited

U.S. PATENT DOCUMENTS

| | | |
|---|---|---|
| 3,074,116 | 1/1963 | Green . |
| 3,817,806 | 6/1974 | Anderson et al. . |
| 3,974,012 | 8/1976 | Hogarth . |
| 4,155,791 | 5/1979 | Higuchi . |
| 4,562,033 | 12/1985 | Johnson et al. . |
| 4,676,853 | 6/1987 | Lerma . |
| 4,777,005 | 10/1988 | Miller ................................. 264/339 |
| 4,816,106 | 3/1989 | Turris et al. . |
| 4,869,770 | 9/1989 | Christensen et al. . |
| 5,023,041 | 6/1991 | Jones et al. . |
| 5,145,621 | 9/1992 | Pratt . |
| 5,225,027 | 7/1993 | Diekwisch . |

FOREIGN PATENT DOCUMENTS 1169233  10/1969  United Kingdom .

Primary Examiner—Jeff H. Aftergut
Attorney, Agent, or Firm—Andrew C. Hess; David L. Narciso

[57] ABSTRACT

A bend portion of a bonded, laminated article is made substantially free of wrinkling, which results in interlaminar voids and discontinuities, by applying tension to at least one layer of a radially outer portion of a preform of the article during bonding, the tension being applied in a direction away from the bend, typically generally tangentially in respect to an inner portion. The apparatus includes a rigid support to carry the preform bend portion, held to the support to enable application of force or pressure to the outer layer.

4 Claims, 3 Drawing Sheets

APPARATUS FOR MAKING A BONDED LAMINATED ARTICLE BEND PORTION

This application is a division of application Ser. No. 08/073,395, filed Jun. 8,1993, now U.S. Pat. No. 5,348,602.

BACKGROUND OF THE INVENTION

This invention relates to laminated articles and, more particularly, to composite laminated articles including a bend portion.

In the manufacture of bonded laminated structures, particularly those including woven composite laminae, disposition of the laminae about an out-of-plane angle, for example around the bend of a flange configuration, can result in non-uniform relative movement of the laminae during bonding or curing. Such movement of one laminate over the other can result in wrinkling or delamination of one or more laminae. This is due to differences in bulk shrinkage from the inner portion of the angle or bend to the outer portion, which includes more length or bulk about the bend. The mismatch in outside to inside arc length around the bend tends to manifest itself as out-of-plane wrinkling between laminae generally within or on either side of the mid portion or "knee" of the bend geometry. Several areas of wrinkling or delamination can occur and voids between bonded laminae have been observed. Frequently, such wrinkling is internal and is not evident from external inspection. The existence of such a condition can result in reduced mechanical properties of the article in the bend portion.

In order to reduce or attempt to eliminate such wrinkling, a number of methods and apparatus has been reported. Typically reported methods provide a force or pressure directly between the bend in the laminated article and the bend of a rigid support member, such as a mold or form. This presses the article bend and the bend support directly together in an attempt to inhibit the formation of wrinkles. One such method and associated apparatus is reported in U.S. Pat. No. 5,145,621—Pratt, patented Sep. 8, 1992, and assigned to the assignee of this invention. The disclosure of such patent is hereby incorporated herein by reference.

SUMMARY OF THE INVENTION

The present invention, in one form provides an improved method for making a laminated article bend portion defined by a plurality of superimposed layers or plies disposed about and extending beyond a bend in the article. One example is the bend portion of the flange of a member, where the flange joins the body of the member. The bend portion includes a radially outer portion defined by at least one of the superimposed layers, and a radially inner portion.

The method form of the invention includes applying tension to the outer portion relative to the inner portion in a direction away from the bend during bonding together of the superimposed layers. Such tension application or "wrapping" of the outer layer about the bend inhibits the formation of wrinkles in the laminae of the bend portion because of differences in bulk shrinkage between laminae of the bend portion.

To facilitate such application of tension to the outer portion, a more specific form of the present invention extends the outer portion farther from the bend than is the radially inner portion. Then, during bonding, a force is applied to the extended portion to develop the tension away from the bend. In one form, such tension displaces the outer portion generally tangentially in respect to the inner portion, for example, to counteract bulk shrinkage.

The apparatus form of the present invention comprises a rigid bend portion support which is appropriately shaped to carry the bend inner portion, holding means to secure the bend portion to the support, and force means to apply force away from the bend using body ply and bend-induced resistance as a counteracting force.

DESCRIPTION OF THE PREFERRED EMBODIMENTS

Figure 1:
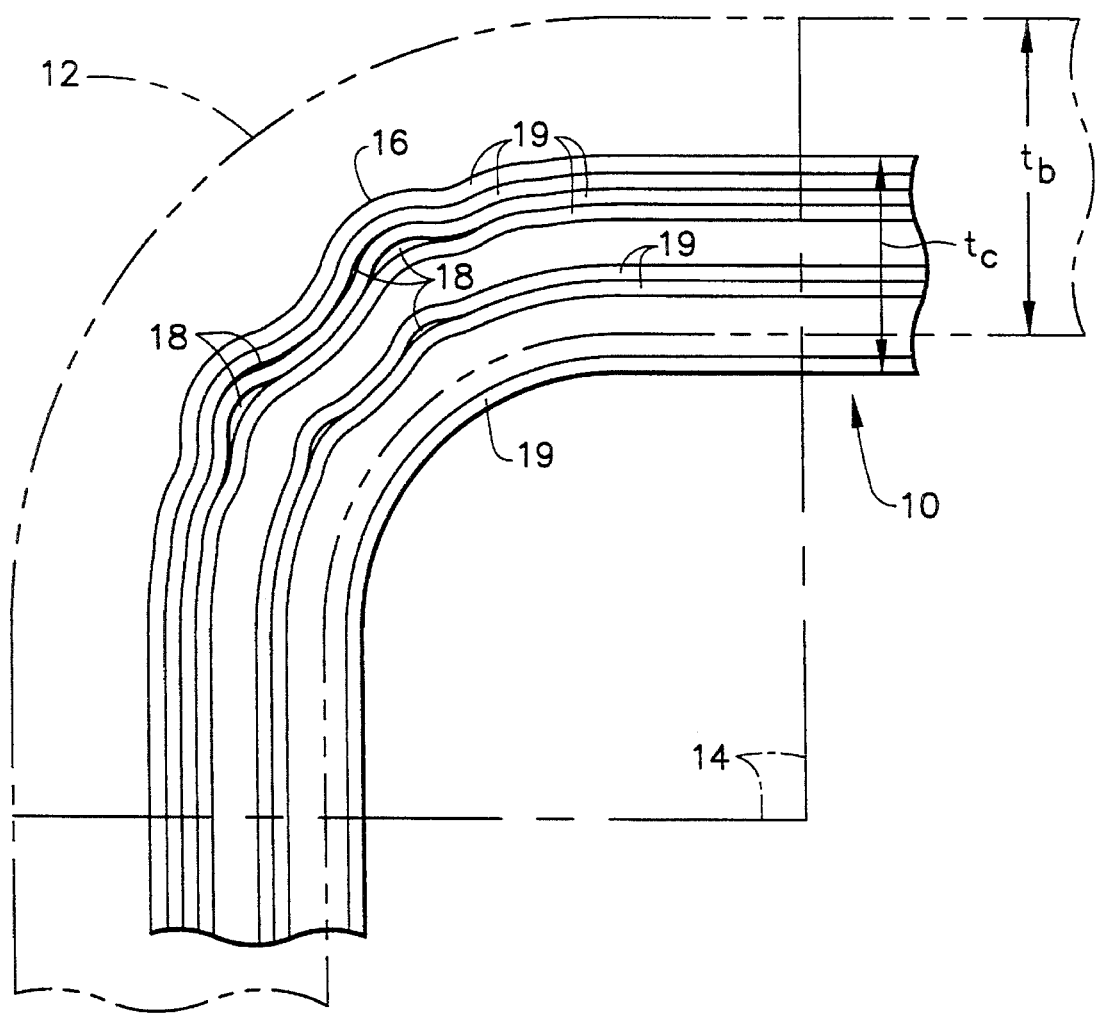
FIG. 1 is an enlarged, diagrammatic representation of a bonded, laminated article including wrinkles and voids between laminae in the bond portion.

The present invention is particularly useful with a structure or article design which utilizes woven composite laminates in the form of out-of-plane angles, particularly substantially right or acute angles. A typical example is a right angle bend in a flange of an article such as is presented in the drawings. Such angled portions can be found at the ends of ducts or panels to be joined with other ducts or panels of other articles.

A variety of such members and articles are used in the manufacture of gas turbine engines. Typically, such members are manufactured from fiber reinforced thermosetting resin or metal composites well known and widely described in the art. Reinforcements include fibers of carbon, graphite, glass, various plastics, metal coated filaments and others reported for use in aerospace applications. Matrices of metals and non-metals have been used, with epoxies and polyimides being widely specified for lower temperature applications. Generally, a fiber arrangement is embedded in an uncured matrix to define a ply, layer, or laminate prior to assembly and final curing. Then a selected plurality of laminae are superimposed or stacked together to provide a preform of a member having a total thickness related to the desired thickness of the cured, consolidated member. Generally, the preform first is debulked such as to remove entrapped air between laminae and to remove some volatile material. Such processing is well known and widely reported in the art.

After debulking, the preform typically is prepared for final curing under pressure. This can be accomplished by using a pressure bag in which the preform is encased and an autoclave which applies pressure to the preform through the bag, while pressure is applied at an appropriate curing temperature. In order to maintain the preform in a desired shape, the preform can be secured with a rigid, appropriately shaped support, sometimes called tooling, prior to enclosure in the pressure bag.

A variety of details of forms of the above generally described processing is included in the description of the above incorporated U.S. Pat. No. 5,145,621—Pratt. Other U.S. Patents, such as U.S. Pat. Nos. 4,676,853—Lerma(patented Jun. 30, 1987); 4,869,770—Christensen et al (patented Sep. 26, 1989); and 5,023,041—Jones et al(patented Jun. 11, 1991) include details of other forms of this widely reported art. The disclosure of the above referenced patents are hereby incorporated herein by reference.

Due to composite material bulk shrinkage through the thickness of a composite laminate structure during cure processing, material surface displacement within a radius formed geometry becomes mismatched by a factor related to differences between inside radius and an outside radius. Such mismatch in outside to inside arc length tends to manifest itself as out-of-plane laminate wrinkling directly within, or on either side of, the "knee" of the geometry.

Depending on the method of molding, wrinkling may or may not be visible as a condition associated with cured structure surface features. Wrinkling as described can give rise to significantly reduced mechanical properties in a flange. The present invention was made to minimize or eliminate out-of-plane laminate wrinkling. Such wrinkling is inherent with a typical autoclave cure process due to lay-up and bag tooling dynamics as well as with press molding equipment, as mold extension mechanisms tend to grab excess material during mold clamshell seating or during debulking.

The enlarged, diagrammatic sectional presentation of FIG. 1 shows a typical wrinkling condition in a bend portion of a laminated flange of an article, for example, the flange at the end of a cylindrical duct joined with the body of the duct. The cured, bonded composite is shown generally at 10 and the uncured composite is shown generally at 12. The bend portion of the flange or member generally is enclosed between reference lines 14—14. The dimension $t_c$ represents the thickness of the cured, bonded composite and $t_b$ represents the thickness of the uncured bulk composite. The difference generated between these dimensions during pressing and cure bonding of the composite, related to the bulk shrinkage during curing or bonding, causes wrinkles, shown generally at 16, to form within the bend portion.

It can be seen that the inner arc length of the uncured composite, in phantom between reference lines 14—14, is significantly larger than the outer arc length of the cured composite shown between lines 14—14. The excess bulk within that portion, reduced during such as pressure curing, produces the undesirable wrinkling condition.

As was stated, sometimes such wrinkled condition is not visible externally. However, such wrinkling forms interlaminar voids and mismatch conditions represented by 18 in FIG. 1 between superimposed, adjacent laminae or layers such as at 19. It has been observed that such discontinuities can reduce mechanical properties of the article in the bend portion.

This problem of wrinkling and void, mismatch formation has been addressed by others in the art. However, known approaches attempt to press the inner and outer arcs of the uncured composite directly together during curing. In this way, the laminae are placed under compression. This is an attempt to inhibit slippage or relative movement between the superimposed laminae in the bend area and to inhibit void formation. Nevertheless, with known methods, the difference in bulk shrinkage is retained by compression in, rather than removed from, the bend portion. Typical drawbacks in such known processing, not inherent in the present invention, include transfer, but not complete elimination of wrinkles within or around a feature region (such as a bend) due to incomplete conformance of certain of the tooling into a feature thickness change during cure processing. Another drawback with known methods is laminate material pinching, gouging or both due to tooling slippage or displacement from desired positioning as a result of variances in lay-up techniques between operators, interaction of materials during processing or their combination.

The method and apparatus of the present invention provide a different kind of approach to wrinkle and void inhibition by removing from the bend area during bonding or curing of the composite the excess bulk shrinkage factor. This removal and bulk shrinkage compensation is accomplished by applying a tension to an outer portion of the uncured composite relative to an inner portion in a direction generally away from the bend portion, rather than compression directly into the bend portion, during curing or bonding of the superimposed layers or laminae of which the composite is comprised. When fiber reinforced, resin impregnated composites are used, generally there is a physical displacement of the outer portion with respect to the inner generally away from the bend portion. Such outer portion displacement through tension, in this form, generally is tangential, incrementally, to the inner portion, as it traverses the arc of the bend and moves into a less arced portion of the member adjacent the bend.

Figure 2:
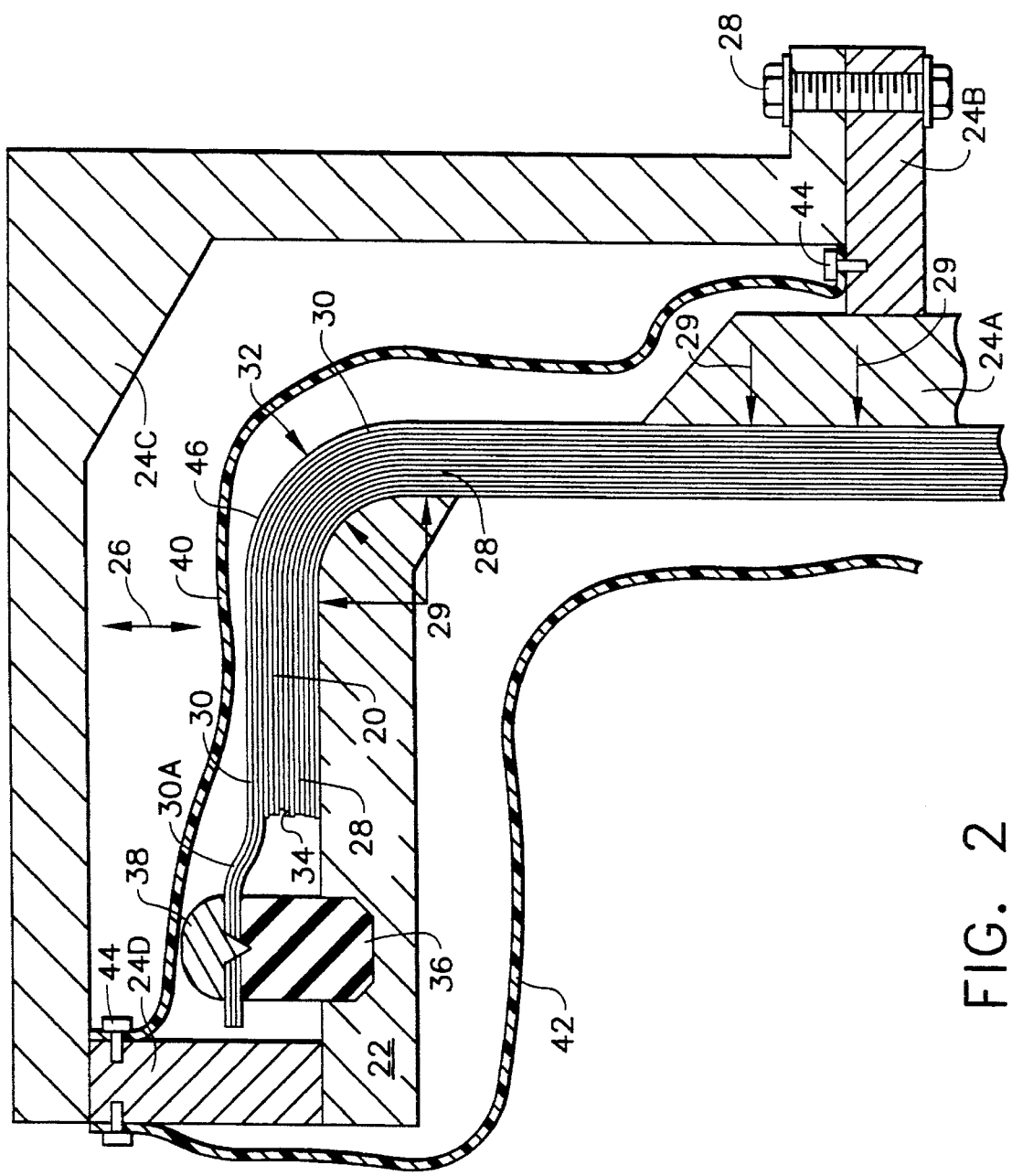
FIG. 2 is a diagrammatic, sectional view of one form of a fragment of a bonded laminated article made by the method of the present invention, disposed on apparatus associated with this invention.

The diagrammatic, fragmentary sectional view of FIG. 2 shows one arrangement of the present invention in position prior to curing. A composite flange preform, shown in fragmentary cross section at 20, is disposed on a rigid metal flange formation mold tool mandrel 22. Associated with mold tool mandrel 22 are rigid support members 24A, 24B, 24C and 24D representing, diagrammatically, the type of tooling used in the art, for example, as shown in the above incorporated U.S. Pat. No. 5,145,621—Pratt. In FIG. 2, the double headed force arrow 26 indicates an adjustable arrangement to pull together members 22 and 24C. Clamping or joining arrangements, represented by nut and bolt arrangement 28, generally are used to join various portions of the support tooling. When assembled for operation, the tooling exerts force on flange preform 20 as shown by various force arrows 29.

In FIG. 2, composite flange preform 20 includes a radially inner layer portion 28 and a radially outer layer portion 30, in respect to bend 32 of flange preform 20. In the embodiment shown in FIG. 2, outer portion 30, includes a portion 30A which extends beyond inner portion 28 at an end 34 of flange preform 20. Such extended portion 30A includes at least one, and generally several, of the plurality of superimposed layers or laminae which define flange preform 20. The edge of the bridge material, which is typically excess material, is captured and held during processing. A clamp or cavity embedded in the mold tool can perform this function. In the preferred embodiment of FIG. 2, an elastomeric anchoring member 36, such as of rubber, for securing extended outer portion 30A during practice of the method of the present invention, is carried by mandrel 22. Such member 36 can be secured by double sided tape, adhesive, threads, etc. Prior to curing of flange preform 20, extended outer portion 30A is secured with member 36 by a holding means such as a clamp, pin, or staple 38. Portion 30A is held relatively taut, rather than slack, for reasons explained below. In this way, flange preform 20 is secured by tooling 22 and 24A through other supporting tooling shown, and extended radially outer portion 30A of preform 20 is secured by anchoring member 36 and holding means 38, bridging a gap at the end of preform 20.

Completing this diagrammatic representation of the assembly prior to curing is a flange vacuum bag 40 and a main vacuum bag 42. Such flexible vacuum bags, of the type well known and widely used in this art, are secured with the support members by a clamp and sealing assembly represented, diagrammatically, generally at 44.

During practice of the present invention, for example using the assembly described in FIG. 2, the outer portion of a plurality of superimposed layers or laminae defining a member preform, such as preform 20, is subjected to tension, relative to an inner portion, in a direction away from a bend in the preform during bonding together of the layers. With the assembly of FIG. 2 as an example, such tension application has been accomplished through the combination of reduced pressure, such as a vacuum within the bags 40 and 42, and additional external pressure exerted within an autoclave which also supplies curing heat to the composite, laminated preform.

Figure 3:
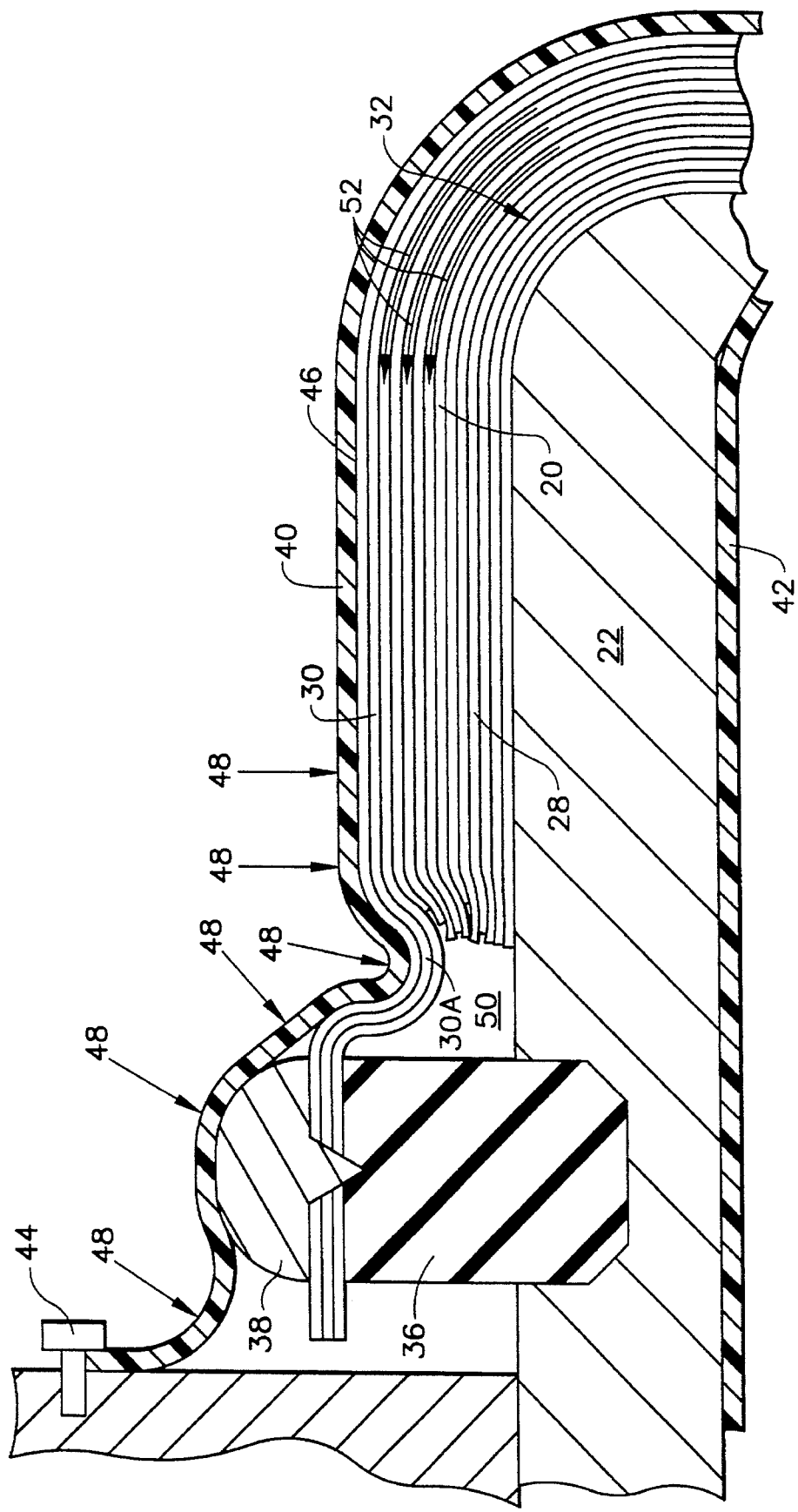
FIG. 3 is a diagrammatic, fragmentary sectional view of a portion of FIG. 2 during operation of the method of the present invention.

The diagrammatic, fragmentary sectional view of FIG. 3 shows a portion of the assembly of FIG. 2 after the usual debulking, for example as described in the above incorporated U.S. Pat. No. 5,145,621—Pratt. The vacuum within flexible bag 40 draws the bag into registry with the outer surface 46 (FIG. 2) of the preform radially outer portion 30 and extended portion 30A. Then application of additional force, represented by arrows 48, transferred through bag 40 to radially outer portion extension 30A, causes extension 30A, held taut and securely by holding means 38 in anchoring member 36, to bow inwardly toward mandrel 22, which is securing preform 20 as described above. Tension is generally in extension 30A in a direction away from bend 32.

In one example of the present invention, the embodiments of FIGS. 2 and 3 used a plurality of polyimide resin-impregnated plies of woven carbon fiber filaments having a thickness of about 0.005 inch thick and a width of about 6 inches. Ten layers or plies were superimposed to define flange preform 20, with the ninth and tenth plies defining radially outer portion 30 and extended portion 30A. Before placing the assembly in an autoclave, a vacuum is drawn within the interior 50 of flange vacuum bag 40 through a typical communicating port (not shown). Atmospheric pressure of about 12–15 pounds per square inch (psi) thereby is applied uniformly to outer surface 46 of preform 20 through bag 40. Then the tooling assembly carrying the preform 20 is placed in an autoclave which then is heated to 600 degrees F under an inert atmosphere of 200 psi. Application of such additional pressure, 200 psi in this example, while heating the preform, causes tautly held extended portion 30A, bridging the gap at the end of the preform, to bow inwardly toward mandrel 22, as shown in FIG. 3. In this embodiment, tension is developed in the bridge of extended portion 30A, tending to move outer portion 30 in a direction away from bend 32. When a polymer impregnated preform is used, as in this example, plies of outer portion 30 are displaced or moved around and away from bend 32 as shown by arrows 52, also representing the direction of tension drawn around bend 32. The displacement of layers or plies of outer portion 30, drawn by the tensioned extended portion 30A, is generally tangential in respect to plies of the inner portion 28.

As the preform 20 was cured in the autoclave, under the conditions described above, in this example for about 3 hours, the movement of outer portion 30 around and away from bend 32 compensated for a predetermined bulk shrinkage of the layers of the preform through its thickness during curing. As was discussed above, such bulk shrinkage can contribute to the formation of the voids and delaminations 18 in FIG. 1. Temperature and pressure conditions within the autoclave and the time of curing are selected based on the materials from which the layers are made and a predetermined bulk shrinkage to be compensated. The present invention, by applying tension about bend 32 to correct bulk shrinkage discrepancies by forcing excess bulk into a waste region to be trimmed after curing, has been seen in photomicrographic evaluations to substantially eliminate such void or delamination defects. Typical dimensioning for bridging ply length and bridge height, for example extended portion 30A, is 0.5 to 0.7 inch in a thin wall structure of about 8 to 16 woven cloth laminate body plies, the outer two plies serving as bridge plies.

The above embodiments represent some, though not all, forms of the present invention. However, it will be understood that use of other types and compositions of layers or plies which define a laminated article to be bonded can require processing conditions and arrangements other than those described above. For practice of the present invention, conditions are selected to bring about application of tension to an outer portion of an article preform, relative to an inner portion, to compensate about a bend in the preform for bulk shrinkage during bonding. Tension tending to draw or displace outer layers of the laminated preform about a bend, rather than compression to press the layers into the bend, can result in substantial elimination of interlaminar voids and discontinuities within the preform. Variables to be selected and which influence the process quality and repeatability include bridging ply length, composite laminate thickness at the bend, bridge height, autoclave pressure, autoclave temperature, and ply slippage for a selected cure cycle. Derivation of variable specifics can be achieved through known mathematical modeling, empirical means, or both. These can be applied to mold tooling arrangements which employ either "male" or "female" feature forming approaches. Those skilled in the art will recognize the variations and modifications of which the present invention is capable without departing from the scope of the appended claims. The examples and embodiments presented here are intended to be typical of, rather than in any way limiting on, the scope of this invention

What is claimed is:

1. Apparatus for making a bonded laminated article bend portion defined by a plurality of superimposed layers disposed about and extending beyond a bend in the article, the bend portion including a radially outer portion defined by at least one of the superimposed layers, and a radially inner portion, the apparatus comprising:

a rigid bend portion support shaped to carry the inner portion of a preform of the bend;

holding means to secure the preform of the bend portion to the support; and, force means to apply force to the radially outer portion of the layers, at a first area away from the bend, to generate tension in the outer portion of the preform in a direction away from the bend.

2. The apparatus of claim 1 wherein said holding means is selected from the group consisting of clamps, pins, and staples.

3. The apparatus of claim 1 further comprising a flexible vacuum bag surrounding said bend portion.

4. Apparatus for making a bonded laminated article bend portion defined by a plurality of superimposed layers disposed about and extending beyond a bend in the article, the bend portion including a radially outer portion defined by at least one of the superimposed layers, and a radially inner portion, the apparatus comprising:

a rigid bend portion support shaped to carry the inner portion of a perform of the bend;

holding means to secure the preform of the bend portion to the support; and, force means to apply force to the radially outer portion of the layers, at a first area away from the bend, to generate tension in the outer portion of the preform in a direction away from the bend; in which an outer portion anchoring member is secured with the rigid bend support at the first area;

said anchoring member being adapted to secure an extension of the outer portion of the preform, and force means being adapted to apply pressure to the extension secured by the anchoring means.

* * * * *